Patented Apr. 12, 1927.

1,624,625

UNITED STATES PATENT OFFICE.

EMIL RAFFLOER, OF DUISBERG-ON-THE-RHINE, GERMANY, ASSIGNOR OF ONE-HALF TO WM. E. LEUCHTENBERG, OF NEW YORK, N. Y.

PROCESS FOR DESULPHURIZING COAL, WATER, OR MIXED GASES FOR ILLUMINATING OR HEATING.

No Drawing.   Application filed January 3, 1925. Serial No. 446.

This invention relates to an improved process for desulphurizing coal, water or mixed gases commonly used for illuminating or heating purposes.

One of the objects of this novel process is to effect desulphurization by a dry means through the medium of a sprayed purifying material such as iron oxide or iron hydroxide, without the admixture of elements now commonly used such as saw dust, wood shavings, cokebreeze or other fluffing material.

A further object of this process invention is to make the use of small containers and apparatus entirely practicable, thereby decreasing expense of installation, and enabling gas works to materially increase their output or capacity without difficulty.

In carrying out this process, the gas, impure, and known as raw gas, is directed into a specially installed pipe line by a suction ventilator and compressed.

My invention consists in leading the main supply of raw gas to be desulphurized into the top or upper part of a desulphurizing chamber, and in blowing an auxiliary supply of the raw gas through a receptacle containing the desulphurizing material in a finely divided state so as to carry said desulphurizing material with it into the bottom or lower part of the desulphurizing chamber, so that the compressed gas coming from the bottom of the chamber spreads the desulphurizing material in the desulphurizing chamber. The main supply of raw gas thus meets the spray of desulphurizing material blown into the chamber.

In the desulphurizing chamber, the raw gas is brought into very close contact with the purifying material which absorbs immediately the sulphur according to the following reaction,

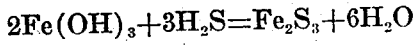

By adding a small percentage of air to the gas stream, about one to two percent, the $Fe_2S_3$ is immediately changed into ferric oxide according to the formula

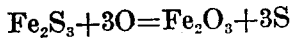

This process continues until the purifying material does not absorb any more sulphur, after which the spent oxide or purifying material is discharged from the lower end of the desulphurizing chamber, and replaced by a new quantity of purifying material.

The purified gas is then led from the desulphurizing chamber through a filter containing the fresh desulphurizing material, which latter is arranged to fall in a stream through the filter, the gas being led through the stream, and the desulphurizing material is thence led into the receptacle through which it is blown into the desulphurizing chamber as before described. Any dust of the purifying material left in the gas is thus removed from the purified gas, which is then led from the filter to the desired place of use or storage.

An apparatus for performing this process forms the subject of a separate application for patent to be filed by me.

There are many advantages gained by the use of the process described and claimed herein. Among them may be named the fact that the purifying material is brought into closest contact with the gas stream to be purified by means of its finely powdered form. Each cubic foot of the purifying material offers an efficient surface to the gas stream, which is the most important factor in gas purification by the dry oxide process, amounting to several thousand square feet.

Obviously, in the ordinary or common method of placing the purifying material in large boxes in layers and mixing with saw dust or the like, and blowing the gas through these layers either from the top or bottom, the purifying material will remain practically stationary, and only a small part of the purifying surface is exposed to the gas in comparison to the novel process described in this invention.

Furthermore, the troublesome and unhealthy, also expensive discharging of containers and refilling is eliminated in the process described in this application. The use of this invention will also enable the velocity of the gas to be enormously increased during purification, and therefore the apparatus may be a small inexpensive one, placed in the open if desired, without the need of providing any special buildings, and furthermore, the purifying material may be completely used up in the process.

It is evident that many changes may be made in the specific construction and process described without departing from the boundaries of my invention as defined by the following claims.

What I claim is:—

1. A process for desulphurizing gases, consisting of introducing the gas to be purified and blowing purifying material in a finely divided form into a desulphurizing chamber where sulphur absorption takes place.

2. A process for desulphurizing gases, consisting of introducing the gas to be purified and blowing the gas with the purifying material in a finely divided form into a desulphurizing chamber where sulphur absorption takes place.

3. A process for desulphurizing gases, consisting of introducing the gas to be purified and blowing the gas with the purifying material in a finely divided form into a desulphurizing chamber, where sulphur absorption takes place, and leading the desulphurized gas through a filter material consisting of the fresh purifying material.

4. A process for desulphurizing gases, consisting of introducing the gas to be purified and blowing finely divided purifying material into a desulphurizing chamber, where sulphur absorption takes place, and then leading the desulphurized gas through a filter containing fresh purifying material as the filtering agent.

5. A process for desulphurizing gases consisting of introducing the gas into one end of a desulphurizing chamber and of blowing into another end of the desulphurizing chamber purifying material in a finely divided form.

6. A process for desulphurizing gases consisting of introducing the gas into one end of a desulphurizing chamber and of blowing into another end of the desulphurizing chamber purifying material in a finely divided form with the gas.

In testimony whereof I affix my signature.

EMIL RAFFLOER.